G. F. HATCH.
TRAP NEST.
APPLICATION FILED DEC. 13, 1916.
1,240,972.
Patented Sept. 25, 1917.
2 SHEETS—SHEET 2.
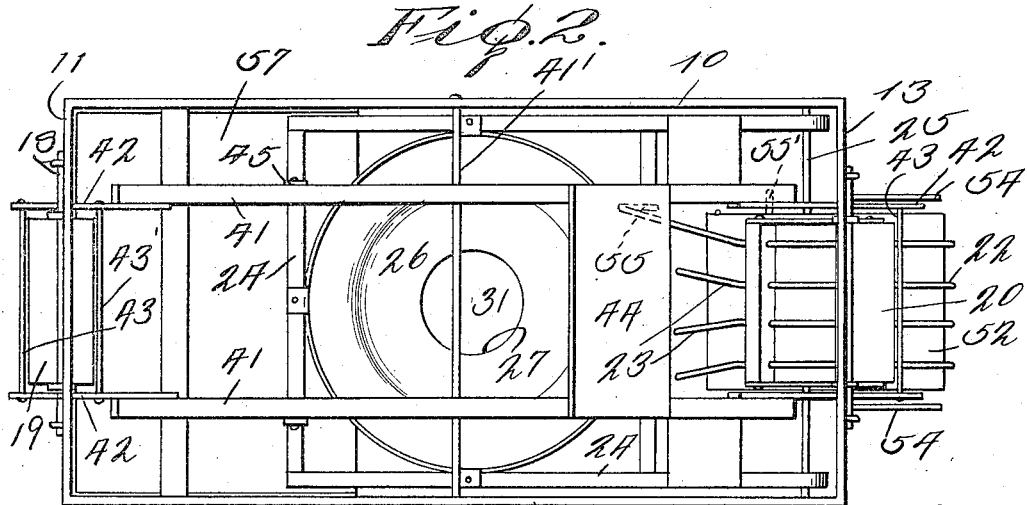
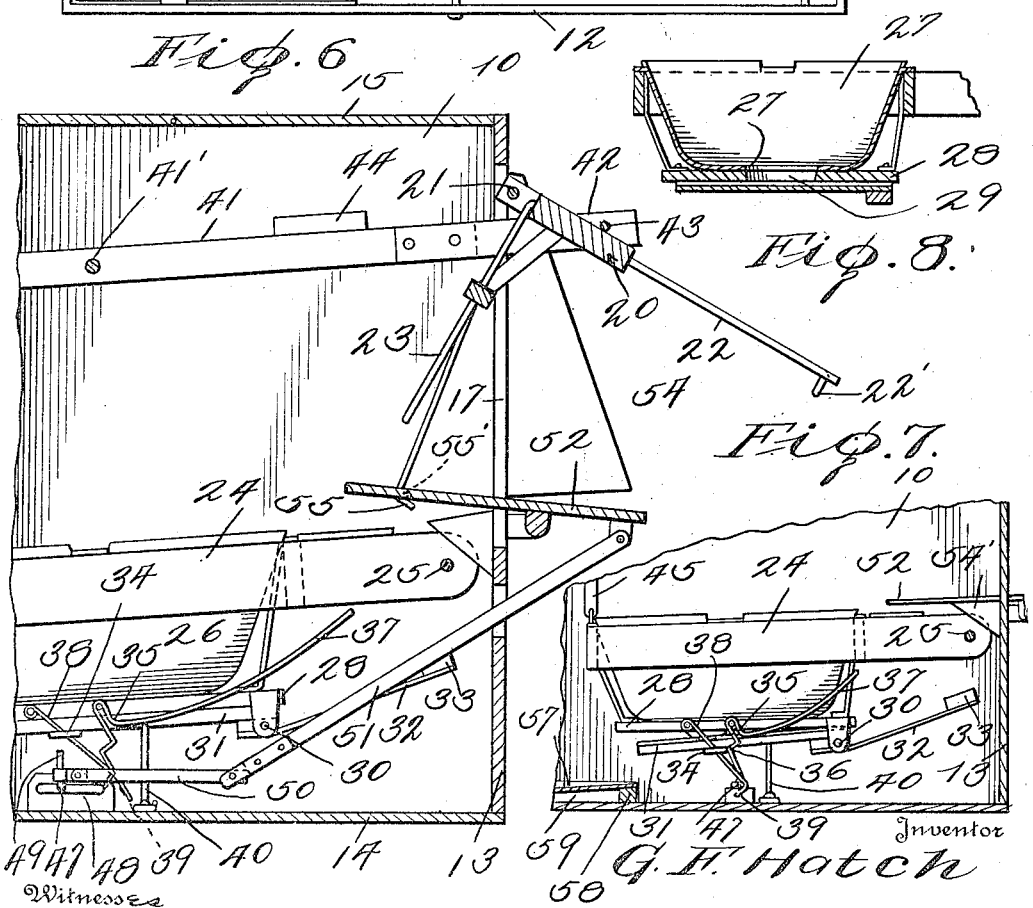

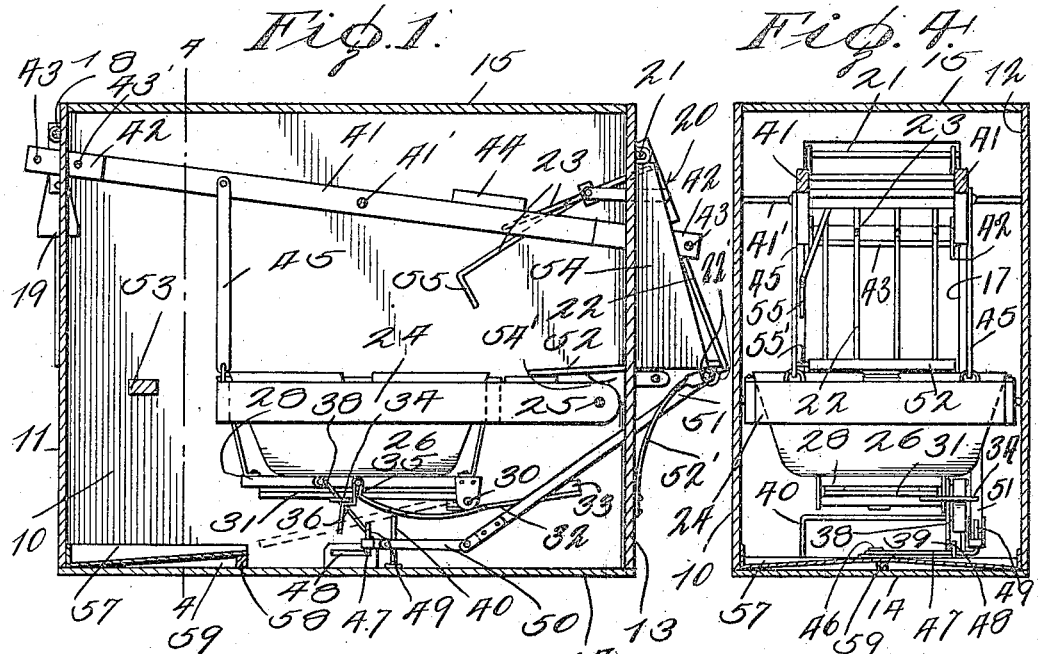
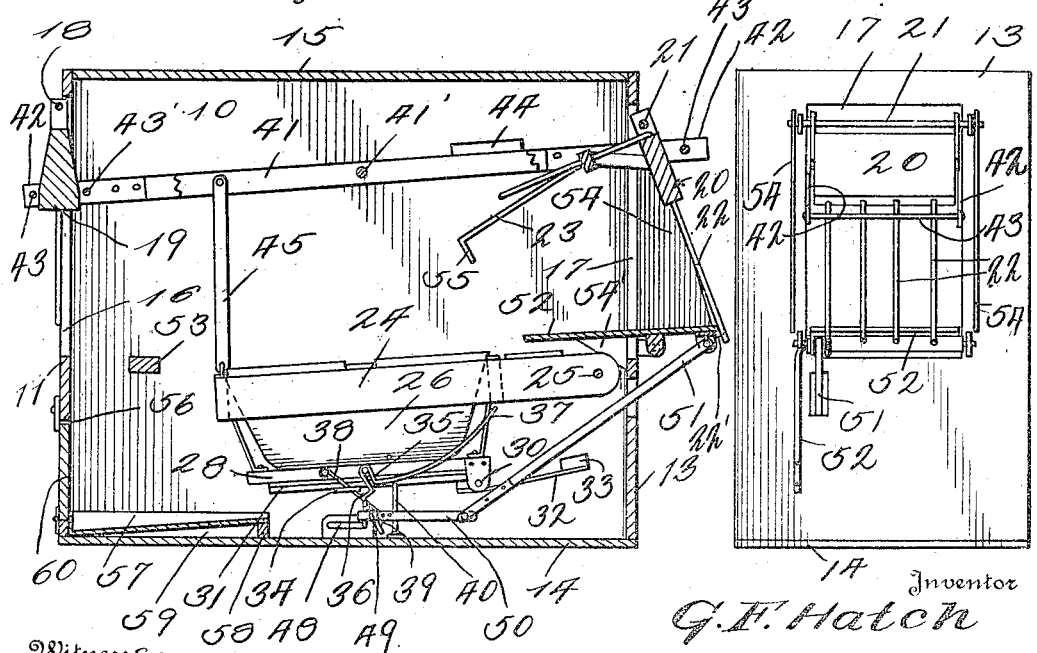

UNITED STATES PATENT OFFICE.

GEORGE F. HATCH, OF ATWATER, CALIFORNIA.

TRAP-NEST.

1,240,972.  Specification of Letters Patent.  Patented Sept. 25, 1917.

Application filed December 13, 1916. Serial No. 136,683.

*To all whom it may concern:*

Be it known that I, GEORGE F. HATCH, a citizen of the United States, residing at Atwater, in the county of Merced, State of California, have invented certain new and useful Improvements in Trap-Nests; and I do hereby declare the following to be a full, clear, and exact description of the invention, such as will enable others skilled in the art to which it appertains to make and use the same.

This invention relates to poultry appliances and is directed more particularly to a trap nest which while it embodies certain of the principles of the structure disclosed in my prior Patent No. 1,198,543 issued Sept. 19, 1916, is of an improved and simplified construction and more efficient in operation.

In carrying out the present invention it is my purpose to provide a trap nest of the type designed for employment in connection with a poultry house, coop or like structure which is divided by a suitable partition into compartments, the nest to be positioned in any desired manner within this partition so that communication between the compartments is established only through the nest, the latter being provided in its ends with openings leading into the respective compartments and embodying certain mechanisms by which the hens entering the same from one compartment to lay, will, after performing such function, be caused to leave the nest by way of the other compartment, while the hens which do not enter the nest, or those which do enter it but fail to lay will be caused to remain in the first compartment.

It is obvious that by such an arrangement the hens will be separated automatically into groups, one of which is composed of the relatively poor producers or non-layers while the other will be composed of the relatively high producers.

It must of course be appreciated that this distinction between the groups cannot be accomplished by any single day's operation of the nest but may only be effected after a more or less protracted period, the manner in which the distinction is made being through the employment of numbered leg bands or other distinguishing marks so that an accurate account and record of the individuals may be kept, those hens which equal or pass a certain set standard of production belonging to the high producing group while those which fall below this standard comprise the low producing group.

A further purpose of the present invention resides in the provision of a nest of the type referred to in which the operation of dividing or separating the hens into groups will be entirely automatic, there being obviated the necessity for personal attendance to the releasing of the hens, a condition usually encountered in nests at present on the market and one which renders uneconomical the operation of trap nests on large farms or poultry plants with which time and labor is distinctly an item.

With the above and other objects of a similar nature in view, the invention consists in the construction, combination, and arrangement of parts set forth in and falling within the scope of the appended claims.

In the drawing:—

Figure 1 is a side elevation of the apparatus with one wall removed and the parts in normal position, Fig. 2 is a top plan view, with the upper wall removed, Fig. 3 is an end view showing the exit opening and its related mechanism, Fig. 4 is a transverse section taken on the line 4—4 of Fig. 1, Fig. 5 is a view similar to Fig. 1 with the parts in depressed position and portions thereof in section, Fig. 6 is a fragmental sectional view illustrating the manner in which the nest is maintained depressed when an egg is deposited therein and the hen steps from the nest, Fig. 7 is an enlarged fragmental view illustrating the position of the parts, as the hen, after laying, passes through the exit opening, and Fig. 8 is a detail section taken longitudinally through the nest.

Referring now more particularly to the accompanying drawing, there is shown a substantially rectangular box including side walls 10 and 12, end walls 11 and 13. a bottom wall 14, and a top wall 15. The end wall 11 is provided adjacent the top 15 with an entrance opening 16 while the end wall 13 is provided, also adjacent the top wall, with an exit opening 17. Arranged transversely of the upper end of the entrance opening is a rod 18 from which is swingingly suspended a door 19 normally held by gravity in position to close the opening.

A door 20 is also swingingly suspended from a rod 21 arranged transversely of the exit opening 17 but this door differs in construction from the door 19 in that it includes a plurality of outwardly and downwardly inclined grids 22 and a plurality of inwardly and downwardly inclined grids 23, the grids 22 being normally held by gravity in position to close the exit opening, while the purpose of the grids 23 will subsequently appear.

Mounted for vertical tilting movement within the box is a frame 24 the forward end of which is pivotally supported as at 25 between the side walls 10 and 12. Supported within this frame 24 is a nest 26, provided in its base with an egg discharge opening 27, the walls of the nest being disposed on an incline so that an egg laid therein will be deflected toward said opening.

Arranged beneath the nest 26 and secured to the frame 24, is a plate 28, provided with an opening 29 registering with the opening 27, and pivoted as at 30 to the plate for vertical swinging movement therebeneath is a door 31 adapted to normally close said registering openings. This door 31 is provided with a rearwardly extending arm 32 carrying at its end a counter-weight 33 which serves to urge the door to normal position.

For retaining the door closed when the nest is in normal position, there is carried thereby a lateral projection 34, and pivoted to the plate 28 is a latch member 35 provided with a shoulder 36 releasably engaged beneath said projection, and further formed with a curved rearward extension 37 the purpose of which will be explained. For limiting downward swinging movement of the door 31 there is pivoted to the plate 28 one end of an arm 38, said arm being slidably engaged through an opening in the projection 34 and terminating at its free end in a forwardly directed hook 39. Arranged transversely of the bottom wall 14 is a substantially U-shaped arch member 40, the legs of which are secured to the bottom wall while its bight is disposed in spaced relation thereto and beneath the nest 26, and extension 37. It will thus be seen that when the nest is depressed, the extension 37 will be engaged and swung upwardly by the arch 40, thereby disengaging the shoulder 36 from the projection 34 and releasing the door 31. It will further be noted that so long as the nest 26 remains depressed, the arch 40 will engage and maintain the door 31 in closed position while when the nest rises to again assume its normal position, said door will be free to open, under the influence of the weight of an egg deposited in the nest, to discharge the same.

Returning now to the entrance and exit doors above described, there is provided for controlling the same, a member 41, intermediately pivoted as at 41' between the side walls 10 and 12 and extending throughout the length of the box at its top.

This member 41 consists of spaced parallel bars suitably connected and braced to provide a frame which carries at its ends parallel extensions 42 passed slidably through the openings 16 and 17 to straddle the respective doors and connected outwardly of said doors by transverse rods 43.

The member 41 further carries rearwardly of its pivot a weight 44 adapted to normally maintain said member in such positions that the entrance 19 will be free to open and permit the entry of a hen into the box, while the exit door 20 will be locked by the rod 43 against opening movement. A transverse rod 43' connecting the extensions 42 inwardly of the entrance door is provided to hold the latter against inward swinging movement when the several parts are depressed.

Rods 45 are provided to operatively connect the members 41 and frame 24 so that when a hen enters the opening 16, steps into the nest and by its weight depresses the frame 24, the member 45 will be rocked on its pivot to release the door 20 and at the same time lock the door 19 against opening movement. Thus in so far as this description has progressed, a hen will enter the opening 16, step into the nest 26, thereby depressing the frame 24 and moving the member 41 into position to lock the entrance door 19 and release the exit door 20, the latch 35 being at the same time engaged and released by the arch member 40 so that the door 31 will be free to open and discharge an egg when the nest rises to again assume its normal position.

It is desirable and essential to the effective operation of this nest, that a hen which enters the box and does not lay be permitted to pass back and out through the entrance opening, while a hen which does lay should pass out through the exit opening.

It has been found after extensive experimentation that the following mechanism operates successfully toward this end. Arranged beneath the nest 26 and pivoted as at 46 to the bottom wall 14 is a trip member 47 working in a slotted guide 48 also secured to said bottom wall. The free end of the trip 47 is directed upward as at 49 and has pivotally connected thereto a link 50, an operating rod 51 being pivotally connected with the link and with a platform 52 mounted for vertical swinging movement in the exit opening 20 so that when the platform is depressed, the trip will be actuated as is obvious a spring 52' being provided for returning the platform to normal position.

Thus a hen enters and depresses the nest and after laying, steps upon the platform 52 thereby relieving the nest of her weight so that it will tend to rise. However as the weight of the egg exerts a downward pressure on the door or closure 31 the same will be urged downward on its pivot and thereby cause the hooked end 39 of the arm 38 to swing beneath the trip 47. The nest is in this manner held depressed until the hen passes onto the outer end of the platform and depresses the same to actuate the rod 51 and link 50 and move the trip out of engagement with the hook 39, when the nest will be free to rise and the door 31 opened by the weight of the egg to permit the same to roll from the nest.

However should the hen fail to lay and endeavor to leave the nest by the exit opening 17, it is evident that no weight will be present upon the door 31 and the arm 37 will therefore, not be moved to a position to retain the nest depressed, the latter rising immediately and the several parts of the mechanism returning to their normal position so that the door 20 will be locked against outward movement and the hen must of necessity leave by the entrance door 19.

It will be observed that the forward end of the frame 24 is spaced from the end wall 11 and that a perch 53 is supported transversely of the box within this space so that a hen which has failed to lay, must step from the nest and onto this perch before passing out through the opening 16, her weight being thus removed from the nest and the parts permitted to return to normal position when the door 19 will be free to open.

It will also be noted that the inner end of the platform 52 is limited in downward movement by a stop 54' secured to the inner face of the end wall 13, whereby when the non-laying hen steps thereon her weight will also be removed from the nest and the parts permitted to assume their normal position with their exit door 20 locked against opening movement. There are furthermore secured to the outer face of the end wall 13 guards 54 arranged at the sides of the exit opening to prevent a hen which has laid an egg from leaving the nest by slipping sidewise between the grids 22 and end wall 13 and thus fail to depress the platform 52 to reset the mechanism.

One of the grids 22 is also extended and bent to provide a hook 22' arranged to engage beneath the platform 52 and prevent its depression by a non-laying hen so that she may not escape from the nest by passing beneath the ends of the grids 22.

Attention is now directed to the door 20, the grids 22 of which are limited in inward movement by the platform 52 while the grids 23 are adapted to swing behind a hen as she raises the grids 22 and thus urge her from the platform. One of the end grids 23 is of a length greater than the others and is directed forwardly to provide a hook 54 adapted to engage beneath a projection 55' on the platform whereby the latter will be held depressed until the hen passes therefrom.

For receiving the egg as it is discharged from the nest and deflecting the same toward the front end of the box from where it may be conveniently reached through an opening 56 formed in the end wall 11, there is provided a tray 57. This tray is supported upon the bottom wall 14 of the box and has arranged beneath its inner end a transverse rib 58 which will give a forward inclination to the tray, a central longitudinal rib 59 being further provided beneath the tray so as to give an inclination thereto to each side of its center. An egg as it is delivered to the tray will thus be deflected forwardly and laterally toward the corners of the box, possibility of breakage by the contact of one egg with another being in this manner minimized. A door 60 hinged to the end wall 11 is employed to normally close the opening 56.

What I claim is:—

1. In a trap nest, an inclosure, a nest provided with an egg discharge opening, a closure for said opening, a pivoted latch mounted on the nest for holding the closure in closed position, means operable by a hen entering the nest to release said latch and permit an egg laid in the nest to pass through said discharge opening, and means for restoring the parts to normal position.

2. In a trap nest, an inclosure, a movable nest having an egg discharge opening, a closure for said opening, means normally holding said closure in closed position, means for releasing said holding means when the nest is depressed and for maintaining the closure in closed position, means operable by an egg deposited in the nest for holding the latter depressed, and means operable by the weight of a departing hen for releasing said last named holding means to permit the return of said nest to normal position and the discharge of the egg through said opening.

3. A trap nest comprising an inclosure provided with an entrance and an exit opening, doors for said openings, a controlling member for alternately locking and releasing said entrance and exit doors, a movable nest provided with a discharge opening, operative connections between the nest and said controlling member, a hinged closure for said discharge opening, means urging said closure to closed position, means for limiting opening movement of the closure, said means being operable by an egg deposited in the nest to hold the latter in one position of its movement, a platform operatively supported in the exit opening, means connected with the platform for releasing said first named means, and permitting the closure to open and discharge the egg, and means for restoring the parts to normal position.

In testimony whereof, I affix my signature, in the presence of two witnesses:

GEORGE F. HATCH.

Witnesses:
M. T. HOLM,
F. FALK.

Copies of this patent may be obtained for five cents each, by addressing the "Commissioner of Patents, Washington, D. C."